(12) United States Patent
Cluzel

(10) Patent No.: US 6,612,353 B2
(45) Date of Patent: Sep. 2, 2003

(54) CROWN REINFORCEMENT FOR A RADIAL TIRE

(75) Inventor: Guy Cluzel, Beaumont (FR)

(73) Assignee: Michelin Recherche et Technique, S.A. (CH)

( * ) Notice: Subject to any disclaimer, the term of this patent is extended or adjusted under 35 U.S.C. 154(b) by 0 days.

(21) Appl. No.: 09/993,029

(22) Filed: Nov. 14, 2001

(65) Prior Publication Data

US 2002/0033213 A1 Mar. 21, 2002

Related U.S. Application Data

(63) Continuation of application No. PCT/FR99/01160, filed on May 14, 1999.

(51) Int. Cl.$^7$ .............................. B60C 9/18; B60C 9/22; B60C 9/28

(52) U.S. Cl. ................. 152/526; 152/529; 152/531; 152/532; 152/535; 152/536; 152/538

(58) Field of Search ................. 152/526, 529, 152/531, 535, 536, 538, 534, 532

(56) References Cited

U.S. PATENT DOCUMENTS

| | | | |
|---|---|---|---|
| 3,999,586 A | | 12/1976 | Wright |
| 4,407,347 A | | 10/1983 | Mirtain |
| 4,945,967 A | | 8/1990 | Tavazza et al. |
| 5,054,532 A | * | 10/1991 | Kohno et al. ............... 152/527 |
| 5,591,284 A | * | 1/1997 | Gaudin ....................... 152/526 |
| 5,738,740 A | | 4/1998 | Cluzel |
| 5,996,662 A | * | 12/1999 | Cluzel ......................... 152/531 |
| 6,401,778 B1 | | 6/2002 | Cluzel ......................... 152/526 |

FOREIGN PATENT DOCUMENTS

| | | |
|---|---|---|
| FR | 2770458 | 5/1999 |
| FR | 2778368 | 11/1999 |
| FR | 2778370 | 11/1999 |
| GB | 2064445 | 6/1981 |

OTHER PUBLICATIONS

U.S. application Ser. No. 09/708,889, filed Nov. 8, 2000, by Guy Cluzel for "Crown Reinforcement for a Tire".
U.S. application Ser. No. 09/708,876, filed Nov. 8, 2000, by Guy Cluzel for "Crown Reinforcement for a Radial Tire".
Search report.

* cited by examiner

Primary Examiner—Jeff H. Aftergut
Assistant Examiner—Justin Fischer
(74) Attorney, Agent, or Firm—Baker Botts LLP

(57) ABSTRACT

A tire having a crown reinforcement formed of at least two working crown plies (32, 34) having axial widths $L_{32}$, $L_{34}$ greater than the width $L_{33}$ of an additional reinforcement (33) of inextensible, substantially radial reinforcement elements, which reinforcement is arranged radially between said plies (32, 34) and is axially composed of three parts, a central part (33') in the form of a ply formed of inextensible, substantially radial reinforcement elements and two lateral parts in the form of strips (33"), each formed of circumferential reinforcement elements, the modulus of elasticity upon traction per unit of width of a lateral strip being at most equal to the modulus of elasticity upon traction, measured under the same conditions, of the most extensible working ply.

13 Claims, 1 Drawing Sheet

CROWN REINFORCEMENT FOR A RADIAL TIRE

This is a continuation of PCT/FR99/01160, filed May 14, 1999, published in French as WO 00/69659 on Nov. 23, 2000.

BACKGROUND OF THE INVENTION

The present invention relates to a tire with radial carcass reinforcement anchored on either side to at least one bead wire and having a crown reinforcement formed of at least two so-called working plies, superposed and made of wires or cables which are parallel in each ply and are crossed from one ply to the next, forming angles of at most 45° in absolute value with the circumferential direction of the tire.

It relates more particularly to a tire of the "heavy vehicle" type, the ratio of the height H above rim to the maximum axial width S of which is at most 0.80, and which is intended to be fitted on a medium- or high-tonnage vehicle, such as a lorry, bus, trailer, etc.

Some current tires, called "highway" tires, are intended to travel at high speed and on longer and longer journeys, owing to the improvement in the road network and the growth of the motorway network throughout the world. All the conditions under which such a tire is required to travel without doubt make it possible to increase the number of kilometers traveled, the wear of the tire being less; on the other hand, the endurance of the latter and in particular of the crown reinforcement is adversely affected.

The lack of endurance relates both to the fatigue resistance of the crown plies, and in particular the resistance to separation between ends of plies, and to the fatigue resistance of the cables of the portion of carcass reinforcement located beneath the crown reinforcement, the first deficiency being greatly influenced by the operating temperature at the edges of the working plies, whether travelling in a straight line or under drift.

A first solution has been described in French Application FR 2 728 510, and proposes arranging, firstly between the carcass reinforcement and the crown reinforcement working ply radially closest to the axis of rotation, an axially continuous ply formed of inextensible metal cables forming an angle of at least 60° with the circumferential direction and the axial width of which is at least equal to the axial width of the shortest working crown ply, and, secondly between the two working crown plies, an additional ply formed of metallic elements oriented substantially parallel to the circumferential direction, the axial width of said ply being at least 0.7 $S_0$.

The problems relating to the separation between working plies and the fatigue resistance of the carcass reinforcement cables have been solved, and the operating temperatures reduced; on the other hand, prolonged travel of the tires thus constructed has caused fatigue breaking of the cables of the additional ply, and more particularly of the edges of said ply, whether or not the so-called triangulation ply is present.

It is always possible to change the reinforcement elements, and in particular to select cables of a different construction or cables of greater tensile strength. The solution above, while admittedly simple, is still costly.

Thus, in order to overcome these above new drawbacks and to improve the endurance of the crown reinforcement of the type of tire in question, French Application FR 97/14011, which has not been published to date, has chosen another solution, and proposes, on either side of the equatorial plane and in the immediate axial extension of the additional ply of reinforcements which are substantially parallel to the circumferential direction, to couple, over a certain axial distance, the two working crown plies formed of reinforcement elements crossed from one ply to the next, then to decouple them by profiled members of rubber mix at least over the remainder of the width common to the said two working plies.

The fatigue strength of the circumferential elements is not optimal, unless the minimum density of the elements at the edges of the ply and a minimum rupture resistance of said elements are respected, which involves a high cost price for material.

In order to improve the endurance of the crown reinforcement of the type of tire in question, without being faced with problems of fatigue of the reinforcement elements, French application FR 98/06000 radically modifies the orientation of the inextensible reinforcement elements of the additional ply which is arranged radially between said working plies, said elements then being radial.

The shearing stresses between the two working crown plies are very great, more particularly in the case of coupling of said two working plies, which results in delamination between the plies as the tire becomes fatigued. In order to overcome the above disadvantages and to improve the endurance of the crown reinforcement of the type of tire in question, the invention proposes ingeniously to reconcile the advantages of radial orientation with those of circumferential orientation of the reinforcements elements of the additional ply located radially between the two working crown plies.

SUMMARY OF THE INVENTION

According to a first variant, the tire according to the invention, with radial carcass reinforcement of maximum axial width $S_0$, comprising a crown reinforcement formed of at least two working crown plies of inextensible reinforcement elements, crossed from one ply to the other, forming angles of between 10° and 45° with the circumferential direction, said plies having axial widths $L_{32}$, $L_{34}$ at least equal to 80% of the width $S_0$, is characterized in that an additional ply formed of at least one ply of reinforcement elements, of width $L_{33}$ less by at least 15% of the width $S_0$ than the width $L_{32}$ ($L_{33}$) of the least wide working ply, arranged radially between said working plies, is axially composed of three parts, a central part in the form of a ply formed of inextensible, substantially radial, metallic reinforcement elements, said ply having an axial width $L'_{33}$ equal to at least 45% of the width $S_0$, and two lateral parts in the form of strips, each formed of circumferential elastic metallic reinforcement elements, the modulus of elasticity upon traction per unit of width of a lateral strip being at most equal to the modulus of elasticity upon traction, measured under the same conditions, of the most extensible working ply, and the width $L''_{33}$ of each strip being at most 10% of the width $S_0$.

"Inextensible element" is to be understood to mean an element, cable or monofilament which has a relative elongation of less than 0.2% when subjected to a tensile force equal to 10% of the breaking load. In the case of the tire in question, the inextensible reinforcement elements are preferably inextensible metal cables made of steel.

Metallic elements oriented substantially parallel to the circumferential direction are elements which form angles within the range +2.5°, −2.5° of said 0° direction.

Substantially radial reinforcement elements, cords or cables are elements which form angles within the range +5°, −5° of the 0° meridian direction.

Metallic reinforcement elements are said to be elastic if they have a relative elongation greater than 2% when they are subjected to a tensile force equal to 10% of their breaking load. They have a curve of tensile stress as a function of the relative elongation which has shallow gradients for the slight elongations and a substantially constant, steep gradient for the greater elongations, the change of gradient taking place in a range of relative elongation of between 0.2% and 0.8%. Owing to this, said elements may be referred to as "bimodular" elements.

A modulus of elasticity E upon traction of a ply per unit of width results from the tensile stress σ exerted in the direction of the reinforcement elements and over a unit of width to obtain a relative elongation ε. "Elasticity modulus of the lateral part of the additional ply which is at most equal to the same modulus of the most extensible working ply" is to be understood to mean that the modulus of said part of the additional ply, whatever the relative elongation, is at most equal to the modulus of the most extensible working ply whatever the relative elongation, the most extensible ply being the ply which, for each value of tensile stress, has a relative elongation greater than that of the other ply for the same stress.

Advantageously, the modulus of the lateral part of the additional ply will be such that it is low for a low relative elongation of between 0% and 0.5%, and at most equal to the greatest modulus of elasticity upon traction of the most extensible working ply, for relative elongations greater than 0.5%, said moduli of elasticity being approximately equal, for a given relative elongation ε, to the products of the tangent modulus of elasticity of the reinforcement elements for said elongation ε and the volume fraction of metal in the ply.

In a second variant, the lateral parts of the additional plies may also be formed of circumferentially inextensible metallic elements cut so as to form sections of a length very much less than the circumference of the least long ply, but preferably greater than 0.1 times said circumference, the cuts between sections being axially offset relative to each other. Such an embodiment makes it possible to impart, in simple manner, to the lateral parts of the additional ply a modulus which can easily be adjusted (by selecting the gaps between sections of the same series), but which in all cases is less than the modulus of the ply formed of the same metallic elements, but continuous ones, the modulus of the additional ply being measured on a vulcanized ply of cut elements, taken from the tire.

In a third variant for obtaining a lateral strip having a lower tensile modulus than the tensile modulus of the most extensible working ply, it is advantageous to use as reinforcement elements for said lateral part undulating metallic elements of circumferential orientation, the ratio a/λ of the amplitude of undulation to wavelength being at most 0.09.

In the last two variants cited, the metallic elements are preferably steel cables.

Preferably, the working plies, on either side of the equatorial plane and in the immediate axial extension of the additional ply, are coupled over an axial distance 1 at least equal to 3.5% of the width $S_0$, then being decoupled by profiled members of rubber mix at least over the remainder of the width common to said two working plies, the presence of said couplings also permitting the reduction of the tensile stresses acting on the circumferential cables of the edge located closest to the coupling.

The thickness of the decoupling profiled members between working plies, measured level with the ends of the least wide working ply, will be at least equal to two millimeters, and preferably greater than 2.5 mm.

"Coupled plies" is to be understood to mean plies, the respective reinforcement elements of which are separated radially by at most 1.5 mm, said thickness of rubber being measured radially between the respectively upper and lower generatrices of said reinforcement elements.

The working plies generally are of unequal axial widths. Whether the radially outermost working ply is axially less wide than the radially innermost working ply, or whether said radially outermost ply is axially wider than the radially innermost working ply, it is then advantageous for the crown reinforcement to be finished off radially to the outside by at least one additional ply, referred to as a protective ply, of so-called elastic reinforcement elements, oriented relative to the circumferential direction at an angle of between 10° and 45° in the same direction as the angle formed by the inextensible elements of the working ply radially adjacent thereto.

An elastic reinforcement element for a protective ply meets the same definition as previously, and has a relative elongation of greater than 2% when subjected to a tensile force of 10% of the breaking load. Said elements are also metal cables made of steel.

The protective ply may have an axial width less than the axial width of the least wide working ply, but advantageously sufficient totally to cover the zone of coupling between the two working crown plies, and all the more advantageously since the tread of the tire in question comprises a circumferential or quasi-circumferential groove axially arranged radially on the zone of coupling between the two working plies. Said protective ply may also have an axial width greater than the axial width of the least wide working ply, such that it covers the edges of the least wide working ply and, in the case of the radially upper ply as being the least wide, such that it is coupled, in the axial extension of the additional reinforcement with the widest working crown ply over an axial distance of at least 2% of the width $S_0$, then being decoupled, axially to the outside, from said widest working ply by profiled members of a thickness of at least 2 mm. The protective ply formed of elastic reinforcement elements may, in the case referred to above, be firstly possibly decoupled from the edges of said least wide working ply by profiled members of a thickness substantially less than the thickness of the profiled members separating the edges of the two working plies, and secondly have an axial width less or greater than the axial width of the widest crown ply.

Whatever the solution adopted, the crown reinforcement may be finished off, radially to the inside between the carcass reinforcement and the radially inner working ply closest to said carcass reinforcement, by a triangulation ply of inextensible metallic reinforcement elements made of steel, forming with the circumferential direction an angle greater than 60° and of the same direction as that of the angle formed by the reinforcement elements of the ply radially closest to the carcass reinforcement. Said triangulation ply may have an axial width less than said least wide working ply, but may also have the necessary width sufficient for said ply to be able to be coupled with another ply, be it with the widest working ply or the protective ply radially above the working plies, or with the widest working ply.

The characteristics and advantages of the invention will be better understood with the aid of the following description, which relates to the drawing, which illustrates an example of embodiment in non-limitative manner.

DESCRIPTION OF PREFERRED EMBODIMENTS

Figure 1:
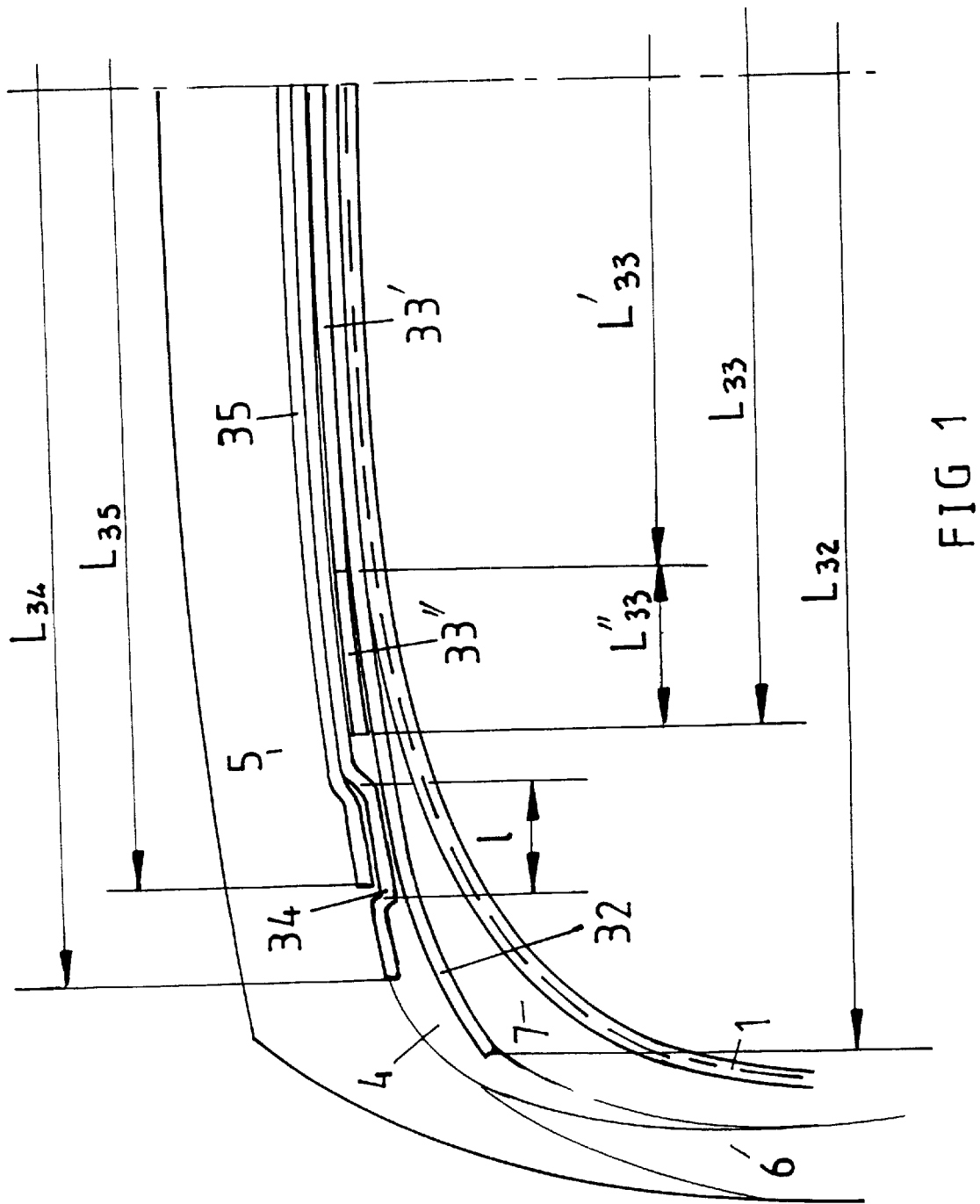
FIG. 1 is a schematic, viewed in meridian section, of a preferred variant of a crown reinforcement according to the invention.

In FIG. 1, the tire, of dimension 495/45 R 22.5 X, has an H/S form ratio of 0.45, H being the height of the tire on its mounting rim and S its maximum axial width. Said tire comprises a radial carcass reinforcement 1 anchored in each bead to at least one bead wire, forming an upturn, and formed by a single ply of metal cables. This carcass reinforcement 1 is hooped by a crown reinforcement 3, formed radially from the inside to the outside:

- by a first working ply 32 formed of inextensible 27.23 hooped metal cables, which are continuous over the entire width of the ply and are oriented by an angle α, equal to 18° in the case illustrated, said ply having an elasticity modulus per unit of width, taking into account the spacing selected between cables, of 5,300 daN/mm$^2$;
- surmounting the first working ply 32, by an additional reinforcement 33, formed of
  - a central part 33' in the form of a ply made of the same inextensible metal cables of steel, said cables being oriented at 90° to the circumferential direction, the axially outer edges of said ply 33' being separated from the working crown ply 32 by layers of rubber of low thickness,
  - two lateral parts 33" in the form of plies formed of continuous elastic bimodular metal cables made of steel, such a cable having a low tangent modulus of elasticity upon traction of the order of 5,000 daN/mm$^2$ for low relative elongations, for example up to 0.4%, and a modulus, for example, greater than 10,000 daN/mm$^2$, which imparts to said lateral part a tangent modulus of elasticity per unit of width substantially equal to 4,000 daN/mm$^2$ for relative elongations greater than 0.6%,
- then by a second working ply 34 formed of inextensible metal cables identical to those of the first working ply 32, and forming an angle β, opposed to the angle α and, in the case illustrated, equal to said angle α of 18° with the circumferential direction (but possibly being different from said angle α);
- and finally by a ply 35 of so-called elastic cables oriented relative to the circumferential direction by an angle γ of the same direction as the angle β and equal to said angle β (but possibly being different from said angle), this final ply being a protective ply formed of elastic metal cables.

The axial width $L_{32}$ of the first working ply 32 is equal to 0.87 times the maximum axial width $S_0$ of the center section of the carcass reinforcement 1, namely 416 mm, which, for a tire of conventional shape, is substantially less than the width of the tread, which is equal in the case in question to 430 mm. The axial width $L_{34}$ of the second working ply 34 is equal to 0.83 times the axial width $S_0$, namely 400 mm. As for the overall axial width $L_{33}$ of the additional ply 33, it is equal to 320 mm. Said width is broken down as follows: the central ply 33' formed of radial cables has a width $L'_{33}$ of 240 mm, which represents 50% of the width $S_0$, each lateral ply 33" formed of undulating circumferential cables has an axial width $L''_{33}$ of 40 mm, the width of a ply with undulating cables being measured from peak to peak of the undulation. The final crown ply 35, referred to as a protective ply, has a width $L_{35}$ substantially equal to 370 mm.

The two working plies 32 and 34, on either side of the equatorial plane and axially in the extension of the additional ply 33, are coupled over an axial width 1, equal in this case to 15 mm. The cables of the first working ply 32 and the cables of the second working ply 34, over the axial width 1 of the coupling of the two plies, are separated radially from each other by a layer of rubber, the thickness of which is minimal and corresponds to twice the thickness of the rubber calendering layer of the hooped metal 27.23 cables of which each working ply 32, 34 is formed, i.e. 0.8 mm. Over the remaining width common to the two working plies, that is to say, approximately 20 mm on either side, the two working plies 32 and 34 are separated by a rubber profiled member 4 of substantially triangular shape, the thickness of said profiled member 4 increasing from the axial end of the coupling zone to the end of the least wide working ply, reaching a thickness of 4 mm at said end. Said profiled member 4 has a sufficient width to radially cover the end of the widest working ply 32 which, in this case, is the working ply radially closest to the carcass reinforcement. The crown of the tire is finished off by a tread 5 joined to the beads by two sidewalls 6, and the triangulation ply, radially adjacent to the carcass reinforcement 1 on either side of the equatorial plane, moves away therefrom axially towards the outside, said ply being joined to the carcass reinforcement 1 by means of triangular profiled members 7 of rubber.

The second solution tested corresponds to the use, for circumferential reinforcement elements for the lateral parts 33" of the additional ply 33, of inextensible metal cables made of steel, such as the cables used in the working crown plies, but cut so as to have sections of cables, the circumferential length of which is equal to ⅙ of the circumferential length of the ply. Said additional ply, in the case in question, has a tangent modulus of elasticity upon traction, per unit of width and for a relative elongation of 0.4%, deemed to be equal to 3,500 daN/mm$^2$.

The third solution corresponds to the use, for circumferential reinforcement elements for the lateral parts 33" of the additional ply 33, of inextensible metal cables made of steel, such as those used in the working crown plies, but undulating, the ratio a/λ of the undulations, a being the amplitude of undulation and λ its wavelength, being at most 0.09, said ratio permitting sufficient elongation of said cables in the case of travelling under strong drift while satisfactorily reinforcing the axial parts of the crown reinforcement in the vicinity of the coupling widths between working crown plies.

I claim:

1. A tire with radial carcass reinforcement of maximum axial width $S_0$, comprising a crown reinforcement formed of at least two working crown plies (32, 34) of inextensible reinforcement elements, crossed from one ply (32) to the other (34), forming angles of between 10° and 45° with the circumferential direction, said plies (32, 34) having axial widths $L_{32}$, $L_{34}$ at least equal to 80% of the width $S_0$, characterized in that an additional reinforcement formed of at least one ply (33) of reinforcement elements, of width $L_{33}$ less by at least 15% of the width $S_0$ than the width of the least wide working ply, and arranged radially between said working plies (32, 34), is axially composed of three parts, a central part (33') in the form of a ply formed of inextensible, substantially radial reinforcement elements, said central part of the ply having an axial width $L'_{33}$ equal to at least 45% of the width $S_0$, and two lateral parts in the form of strips (33"), each formed of circumferential elastic metallic reinforcement elements; the modulus of elasticity upon traction per unit of width of a lateral strip being at most equal to the modulus of elasticity upon traction, measured under the same conditions, of the most extensible working ply, and the width $L''_{33}$ of each strip being at most 10% of the width $S_0$.

2. A tire with radial carcass reinforcement of maximum axial width $S_0$, comprising a crown reinforcement formed of at least two working crown plies (32, 34) of inextensible reinforcement elements, crossed from one ply (32) to the other (34), forming angles of between 10° and 45° with the circumferential direction, said plies having axial widths $L_{32}$, $L_{34}$ at least equal to 80% of the width $S_0$, characterized in that an additional reinforcement formed of least one ply (33) of reinforcement elements, of width $L_{33}$ less by at least 15% of the width $S_0$ than the width of the least wide working ply, and arranged radially between said working plies, is axially composed of three parts, a central part (33') in the form of a ply formed of inextensible, substantially radial reinforcement elements, said central part of said ply having an axial width $L'_{33}$ equal to at least 45% of the width $S_0$, and two lateral parts in the form of strips (33''), each formed of circumferential metallic reinforcement elements, cut so as to form sections of a length less than the circumference of the least long ply, but greater than 0.1 times said circumference, the cuts between sections being axially offset relative to each other, the modulus of elasticity upon traction per unit of width of a lateral strip being less than the modulus of elasticity upon traction, measured under the same conditions, of the most extensible working ply, and the width $L''_{33}$ of each strip being at most 10% of the width $S_0$.

3. A tire with radial carcass reinforcement of maximum axial width $S_0$, comprising a crown reinforcement formed of at least two working crown plies (32, 34) of inextensible reinforcement elements, crossed from one ply (32) to the other (34), forming angles of between 10° and 45° with the circumferential direction, said plies (32, 34) having axial widths $L_{32}$, $L_{34}$ at least equal to 80% of the width $S_0$, characterized in that an additional reinforcement formed of least one ply (33) of reinforcement elements, of width less by at least 15% of the width $S_0$ than the width of the least wide working ply, and arranged radially between said working plies, is axially composed of three parts, a central part (33') in the form of a ply formed of inextensible, substantially radial reinforcement elements, said central part of the ply having an axial width $L'_{33}$ equal to at least 45% of the width $S_0$, and two lateral parts in the form of strips (33''), each formed of circumferential, inextensible, undulating metallic reinforcement elements, the ratio a/λ of the amplitude of undulation a to wavelength λ, being at most 0.09, the modulus of elasticity upon traction per unit of width of a lateral strip (33'') being less than the modulus of elasticity upon traction, measured under the same conditions, of the most extensible working ply, and the width $L''_{33}$ of each strip being at most 10% of the width $S_0$.

4. A tire according to claim 1, characterized in that the elastic metallic reinforcement elements of the lateral parts (33'') of the additional ply (33) have a curve of tensile stress σ as a function of the relative elongation ε, wherein said curve has a first part and a second part, wherein the gradient of said first part is lower than the gradient of said second part, the change of gradient taking place in a range of relative elongation of between 0.2% and 0.8%.

5. A tire according to claim 1, characterized in that the tensile modulus for each lateral part (33'') of the additional ply (33) is such that the tensile modulus is lower for a relative elongation of between 0 and 0.5% than for a relative elongation greater than 0.5%.

6. A tire according to one of claims 1 to 3, characterized in that the inextensible reinforcement elements of the working plies and central part (32, 34, 33') are metal cables made of steel.

7. A tire according to one of claims 1 to 3, characterized in that the working plies (32, 34), on either side of the equatorial plane and in an immediate axial extension of the additional ply (33), are coupled over an axial distance 1 at least equal to 3.5% of the width $S_0$, then being decoupled by profiled members (4) of rubber mix at least over the remainder of the width common to said two working plies (32, 34).

8. A tire according to one of claims 1 to 3, characterized in that the crown reinforcement includes radially to the outside at least one additional protective ply (35) of elastic reinforcement elements which are oriented relative to the circumferential direction at an angle of between 10° and 45° and of the same direction as the angle formed by the inextensible elements of a working ply radially adjacent thereto.

9. A tire according to claim 8, characterized in that the elastic reinforcement elements of the protective ply (35) are metal cables made of steel.

10. A tire according to claim 8, characterized in that the protective ply (35) has an axial width $L_{35}$ greater than the axial width of the least wide radially upper working ply (34), such that it covers the edges of said least wide working ply and such that it is coupled, in the axial extension of the additional reinforcement (33), with the widest working crown ply (32) over an axial distance of at least 2% of the width $S_0$, then being decoupled, axially to the outside, from said widest working ply (32) by profiled members of a thickness of at least 2 mm.

11. A tire according to one of claims 1 to 3, characterized in that the crown reinforcement includes radially to the inside between the carcass reinforcement and the radially inner working ply (32) closest to said carcass reinforcement, a triangulation ply of inextensible metallic reinforcement elements made of steel, forming with the circumferential direction an angle greater than 60° and of the same direction as that of the angle formed by the reinforcement elements of the ply (32) radially closest to the carcass reinforcement.

12. A tire with radial carcass reinforcement of maximum axial width $S_0$, comprising a crown reinforcement formed of at least two working crown plies (32, 34) of inextensible reinforcement elements, crossed from one ply (32) to the other (34), forming angles of between 10° and 45° with the circumferential direction, said plies (32, 34) having axial widths $L_{32}$, $L_{34}$ at least equal to 80% of the width $S_0$, characterized in that an additional reinforcement formed of least one ply (33) of reinforcement elements, of width $L_{33}$ less by at least 15% of the width $S_0$ than the width of the least wide working ply, and arranged radially between said working plies (32, 34), is axially composed of three parts, a central part (33') in the form of a ply formed of inextensible, substantially radial reinforcement elements, said central part of the ply having an axial width $L'_{33}$ equal to at least 45% of the width $S_0$, and two lateral parts in the form of strips (33''), each formed of circumferential elastic metallic reinforcement elements; the modulus of elasticity upon traction per unit of width of a lateral strip being at most equal to the modulus of elasticity upon traction, measured under the same conditions, of the most extensible working ply, and the width L"33 of each strip being at most 10% of the width $S_0$ wherein the working plies (32, 34), on either side of the equatorial plane and in an immediate axial extension of the additional ply (33), are coupled over an axial distance 1 at least equal to 3.5% of the width $S_0$, then being decoupled by profiled members (4) of rubber mix at least over the remainder of the width common to said two working plies (32, 34).

13. A tire with radial carcass reinforcement of maximum axial width $S_0$, comprising a crown reinforcement formed of at least two working crown plies (32, 34) of inextensible reinforcement elements, crossed from one ply (32) to the other (34), forming angles of between 10° and 45° with the circumferential direction, said plies (32, 34) having axial widths $L_{32}$, $L_{34}$ at least equal to 80% of the width $S_0$, characterized in that an additional reinforcement formed of at least one ply (33) of reinforcement elements, of width less by at least 15% of the width $S_0$ than the width of the least wide working ply, and arranged radially between said working plies, is axially composed of three parts, a central part (33') in the form of a ply formed of inextensible, substantially radial reinforcement elements, said central part of the ply having an axial width $L'_{33}$ equal to at least 45% of the width $S_0$, and two lateral parts in the form of strips (33"), each formed of circumferential, inextensible, undulating metallic reinforcement elements, the ratio $a/\lambda$ of the amplitude of undulation a to wavelength $\lambda$, being at most 0.09, the modulus of elasticity upon traction per unit of width of a lateral strip (33") being less than the modulus of elasticity upon traction, measured under the same conditions, of the most extensible working ply, and the width $L"_{33}$ of each strip being at most 10% of the width $S_0$ wherein the working plies (32, 34), on either side of the equatorial plane and in an immediate axial extension of the additional ply (33), are coupled over an axial distance 1 at least equal to 3.5% of the width $S_0$, then being decoupled by profiled members (4) of rubber mix at least over the remainder of the width common to said two working plies (32, 34).

* * * * *